US008893056B2

(12) United States Patent
Jung et al.

(10) Patent No.: US 8,893,056 B2
(45) Date of Patent: Nov. 18, 2014

(54) MOBILE TERMINAL AND CONTROLLING METHOD THEREOF

(75) Inventors: Jong Cheol Jung, Seoul (KR); Hong Joo Kim, Seoul (KR); Jae Woong Yun, Goyang-si (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 13/049,841

(22) Filed: Mar. 16, 2011

(65) Prior Publication Data

US 2011/0244924 A1 Oct. 6, 2011

(30) Foreign Application Priority Data

Apr. 6, 2010 (KR) .......................... 10-2010-0031181
Apr. 8, 2010 (KR) .......................... 10-2010-0032186

(51) Int. Cl.
*G06F 3/14* (2006.01)
*G06F 3/0481* (2013.01)
*G06F 3/0485* (2013.01)
*G06F 3/0486* (2013.01)
*G06F 3/0488* (2013.01)
*G06F 3/0482* (2013.01)

(52) U.S. Cl.
CPC ............ *G06F 3/0482* (2013.01); *G06F 3/0481* (2013.01); *G06F 3/0485* (2013.01); *G06F 3/04817* (2013.01); *G06F 3/04855* (2013.01); *G06F 3/0486* (2013.01); *G06F 3/0488* (2013.01)
USPC .......................................... 715/864; 715/700

(58) Field of Classification Search
CPC .............................. G06F 3/0481; G06F 3/0488
See application file for complete search history.

(56) References Cited

U.S. PATENT DOCUMENTS

| 7,735,021 | B2* | 6/2010 | Padawer et al. ............... 715/810 |
| 2002/0115476 | A1* | 8/2002 | Padawer et al. ............... 455/564 |
| 2004/0100479 | A1* | 5/2004 | Nakano et al. ................ 345/700 |
| 2005/0285866 | A1* | 12/2005 | Brunner et al. ............... 345/537 |
| 2006/0085384 | A1* | 4/2006 | Sato et al. ......................... 707/1 |
| 2006/0132455 | A1* | 6/2006 | Rimas-Ribikauskas et al. ............................. 345/173 |
| 2006/0242607 | A1* | 10/2006 | Hudson ......................... 715/863 |

(Continued)

FOREIGN PATENT DOCUMENTS

CN 101650672 2/2010

OTHER PUBLICATIONS

Microsoft Support, How to use Windows Task Manager, Jan. 14, 2008, pp. 1-2, www.support.microsoft.com/kb/323527.*

*Primary Examiner* — Matt Kim
*Assistant Examiner* — Mahelet Shiberou
(74) *Attorney, Agent, or Firm* — Lee, Hong, Degerman, Kang & Waimey

(57) ABSTRACT

A mobile terminal and controlling method thereof are disclosed, by which a selection and/or execution of an application can be designated using a list of applications currently executed in a multitasking environment. The present invention includes a display unit, a user input unit configured to receive an input of a command from a user, and a controller, when a plurality of applications are being executed, if there is a first input via the user input unit, controlling a list of a plurality of the currently executed applications to be displayed on a first region, the controller, if one of at least one or more applications running in the background in the list is selected by a second input via the user input unit, controlling the selected application to be displayed on a second region of the display unit by having a prescribed visual effect applied thereto.

17 Claims, 14 Drawing Sheets

(56) References Cited

U.S. PATENT DOCUMENTS

| | | | |
|---|---|---|---|
| 2007/0266342 A1* | 11/2007 | Chang et al. | 715/810 |
| 2008/0081600 A1* | 4/2008 | Choi | 455/418 |
| 2008/0119237 A1* | 5/2008 | Kim | 455/566 |
| 2008/0163082 A1* | 7/2008 | Rytivaara | 715/762 |
| 2008/0307342 A1* | 12/2008 | Furches et al. | 715/764 |
| 2009/0128516 A1* | 5/2009 | Rimon et al. | 345/174 |
| 2009/0249247 A1* | 10/2009 | Tseng et al. | 715/808 |
| 2009/0298418 A1* | 12/2009 | Michael et al. | 455/3.04 |
| 2009/0325563 A1* | 12/2009 | Horodezky et al. | 455/418 |
| 2010/0070903 A1* | 3/2010 | Andell et al. | 715/771 |
| 2011/0061056 A1* | 3/2011 | Shu | 718/103 |

\* cited by examiner

FIG. 5
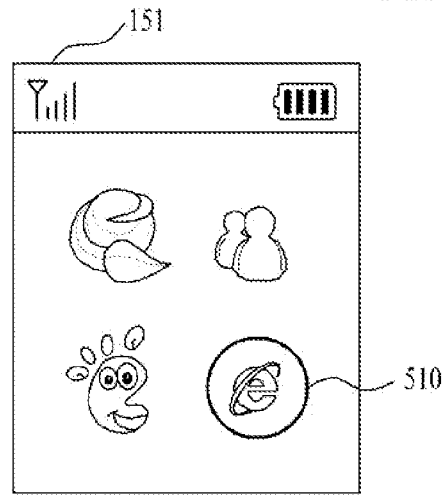
(a)
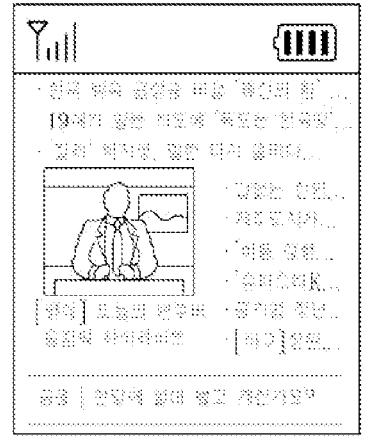
(b)
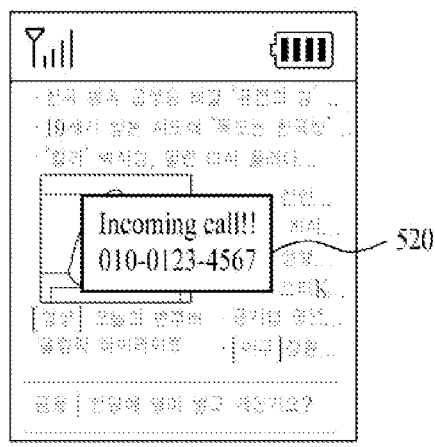
(c)
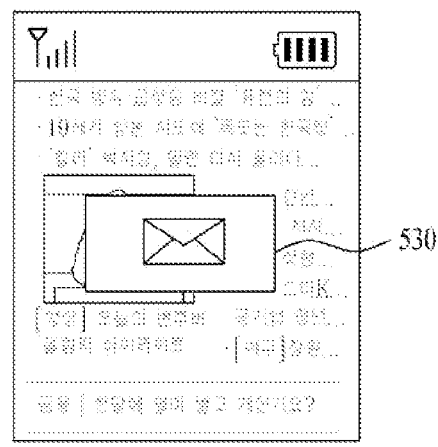
(d)
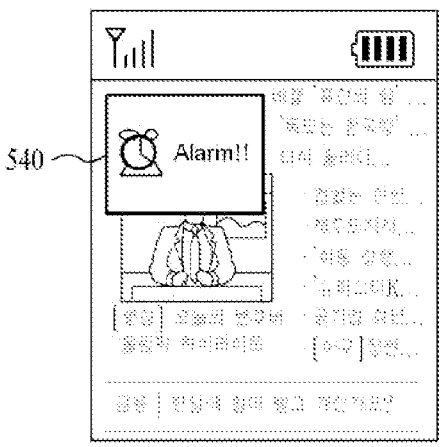
(e)
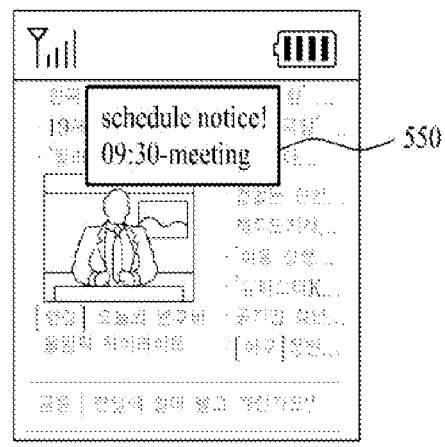
(f)

FIG. 7
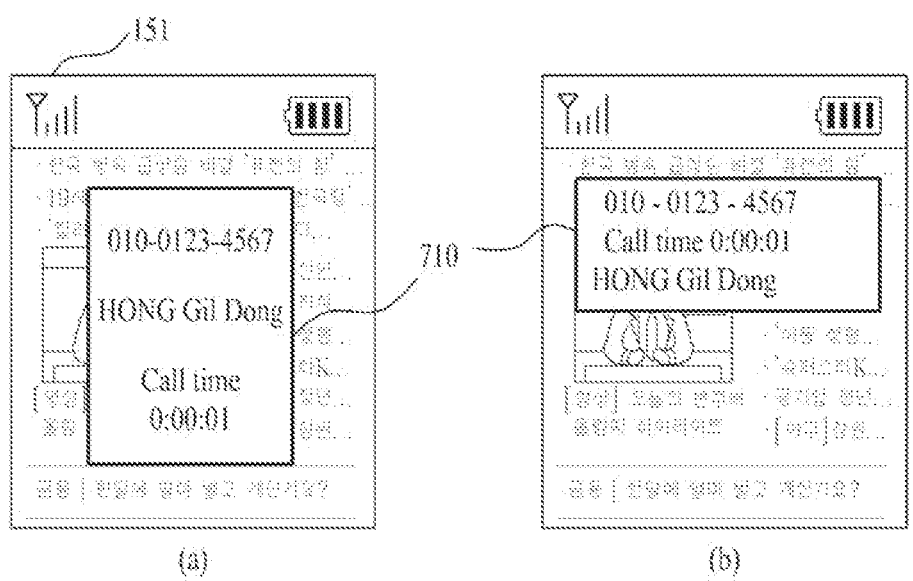
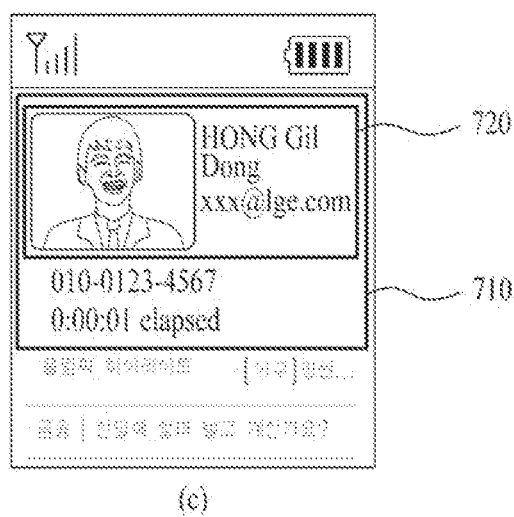

FIG. 9
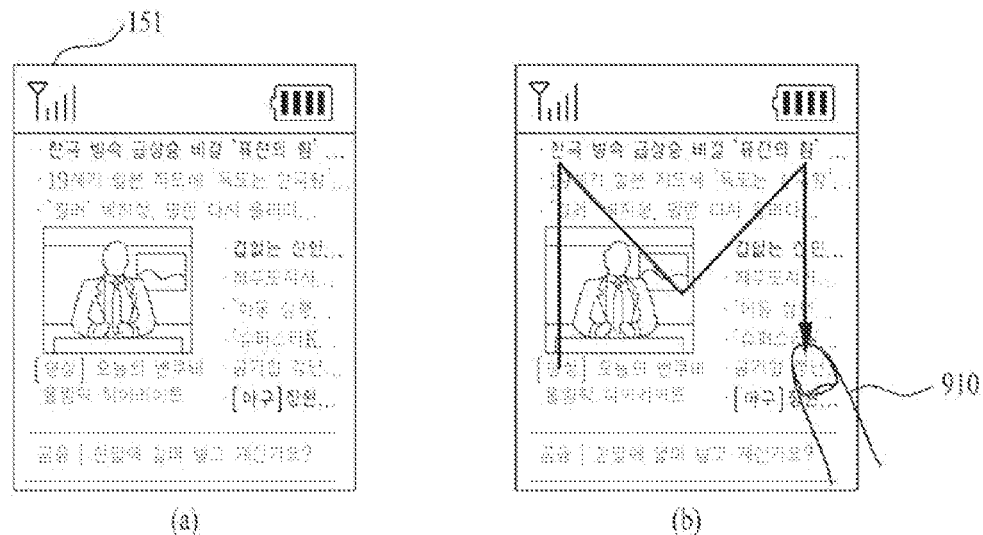
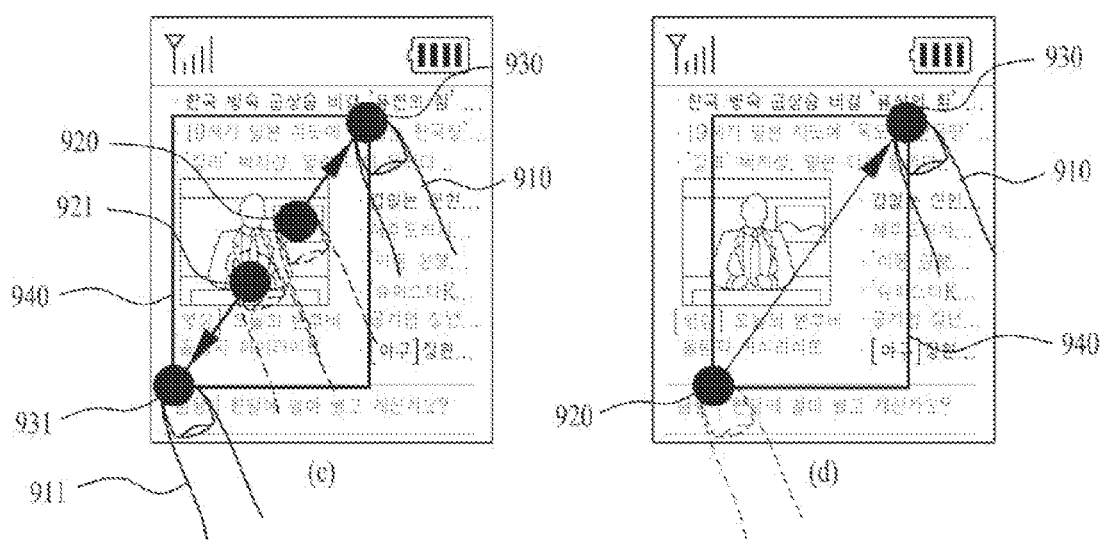

FIG. 14
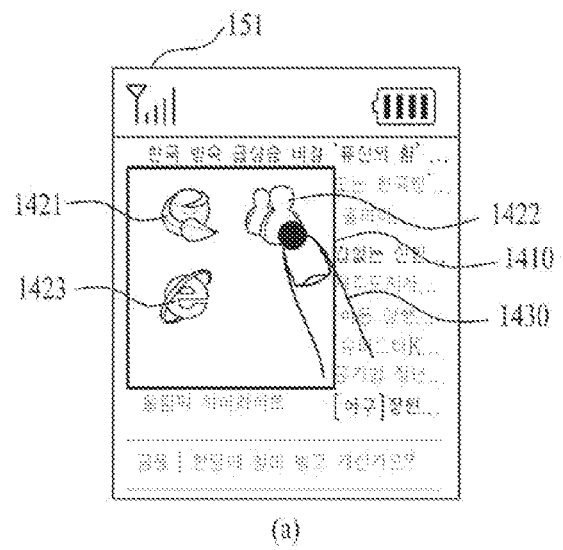
(a)
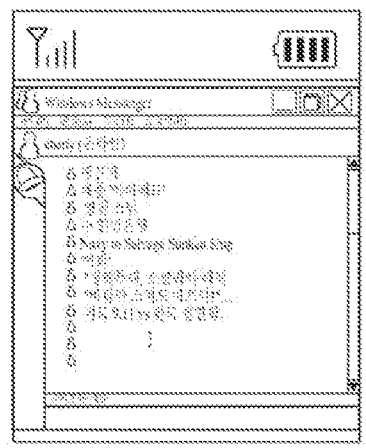
(b)
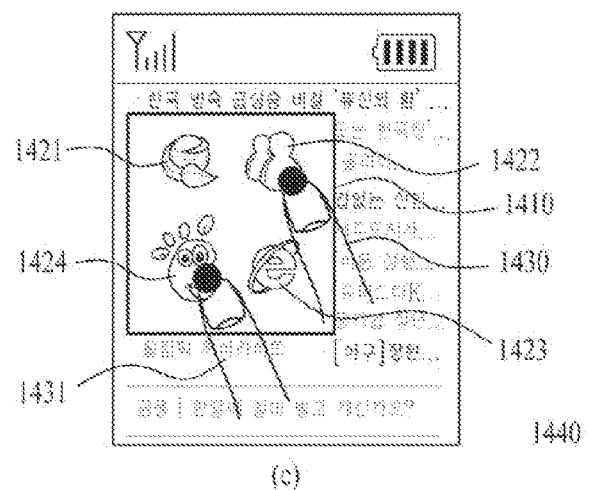
(c)
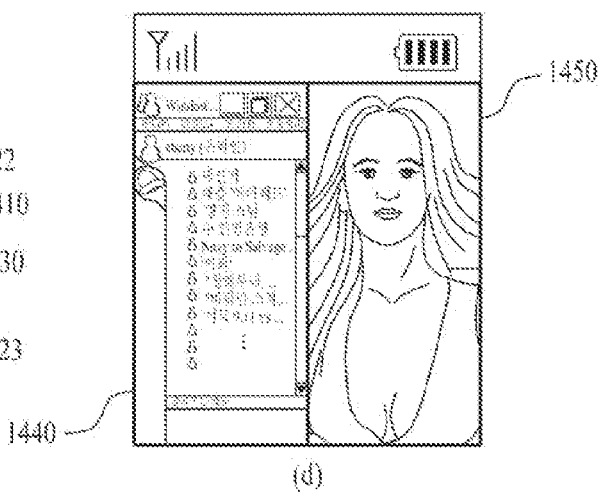
(d)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application Nos. 10-2010-0031181, filed on Apr. 6, 2010 and 10-2010-0032186, filed on Apr. 8, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for designating an execution region of an application related to an event occurring in a multitasking environment or enabling an application selection and an execution designation using a list of applications in the course of execution.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, as a multitasking function of executing and controlling at least two applications simultaneously is implemented owing to the enhancement of mobile terminal performance, the demand for efficient user interfaces are ongoing to rise.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which an execution region of an application related to an event occurring in multitasking environment can be efficiently designated.

Another object of the present invention is to provide a mobile terminal and controlling method thereof, by which a display type of an application is changed according to an execution region designated for an application related to an event occurring in a multitasking environment.

Another object of the present invention is to provide a mobile terminal and controlling method thereof, by which a user is facilitated to check information on applications currently executed in a multitasking environment.

A further object of the present invention is to provide a mobile terminal and controlling method thereof, by which a work switching are conveniently switchable between applications in the course of execution.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a user input unit configured to receive an input of a command from a user, and a controller, when a first application is being executed, if a first region of the display unit is selected by a first input via the user input unit, controlling a prescribed menu list to be displayed on the first region, the controller, if a second application is selected from the prescribed menu list by a second input via the user input unit, controlling the second application to be displayed on the first region or a second region of the display unit.

In another aspect of the present invention, a method of controlling a mobile terminal includes the steps of executing a first application on a display unit, if a specific event occurs, displaying an event indication corresponding to the occurring event on a first region of the display unit, selecting a second region of the display unit by a user's command input while the vent indication is valid, and executing a second application corresponding to the occurring event within the second region.

In another aspect of the present invention, a mobile terminal includes a display unit, a user input unit configured to receive an input of a command from a user, and a controller, when a plurality of applications are being executed, if there is a first input via the user input unit, controlling a list of a plurality of the currently executed applications to be displayed on a first region, the controller, if one of at least one or more applications operating as backgrounds in the list is selected by a second input via the user input unit, controlling the selected application to be displayed on a second region of the display unit by having a prescribed visual effect applied thereto. Preferably, the second region includes a region displayed on the display unit before the selected application operates as the background.

In another aspect of the present invention, a mobile terminal includes a display unit, a user input unit configured to receive an input of a command from a user, and a controller, when a plurality of applications are being executed, if there is a first input via the user input unit, controlling a list of a plurality of the currently executed applications a multitasking list including a shortcut function of directly going to a main menu to be displayed on a first region of the display unit, the controller if the shortcut function is selected by a second input via the user input unit, controlling the main menu to be displayed on the first region.

In a further aspect of the present invention, a method of controlling a mobile terminal includes the steps of when a plurality of applications are currently executed, displaying a list of a plurality of the currently executed applications on a first region of a display unit, selecting an application operating as a background from the list, displaying the selected application on a second region of the display unit in a manner of having a prescribed visual effect applied thereto, and reactivating the selected application according to a presence or non-presence of reselection of the selected application and a presence or non-presence of the second region. Preferably, the second region includes a region displayed on the display unit before the selected application operates as the background.

Accordingly, the present invention provides the following effects and/or advantages.

First of all, a mobile terminal according to embodiment of the present invention is able to designate an execution region of an application related to an event occurring in a multitasking environment via a touch or multi-touch applied to a touchscreen freely and efficiently.

Secondly, a display type and/or content of an application is conveniently changeable according to a size of an execution region designated for an application related to an event occurring in a multitasking environment.

Thirdly, a mobile terminal according to a third embodiment of the present invention enables a list of applications currently executed in a multitasking environment to be displayed on a prescribed region, thereby facilitating a currently executed application to be checked using the displayed list.

Fourthly, the present invention facilitates a work to be switchable using a list or icons of applications.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5(a)-5(f) are diagrams of screen configurations for displaying an event indication related to a second application according to one embodiment of the present invention;

FIGS. 7(a)-7(c) are diagrams of screen configurations for displaying an execution type of a second application in accordance with a type of a region designated by a user in a mobile terminal according to another example of one embodiment of the present invention;

FIGS. 9(a)-9(d) are diagrams of screen configurations for displaying a method of paging a multitasking list according to another embodiment of the present invention;

FIGS. 14(a)-14(d) are diagrams of screen configurations for displaying one example of a type of reactivating a selected background application in accordance with the number of background applications according to another example of another embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
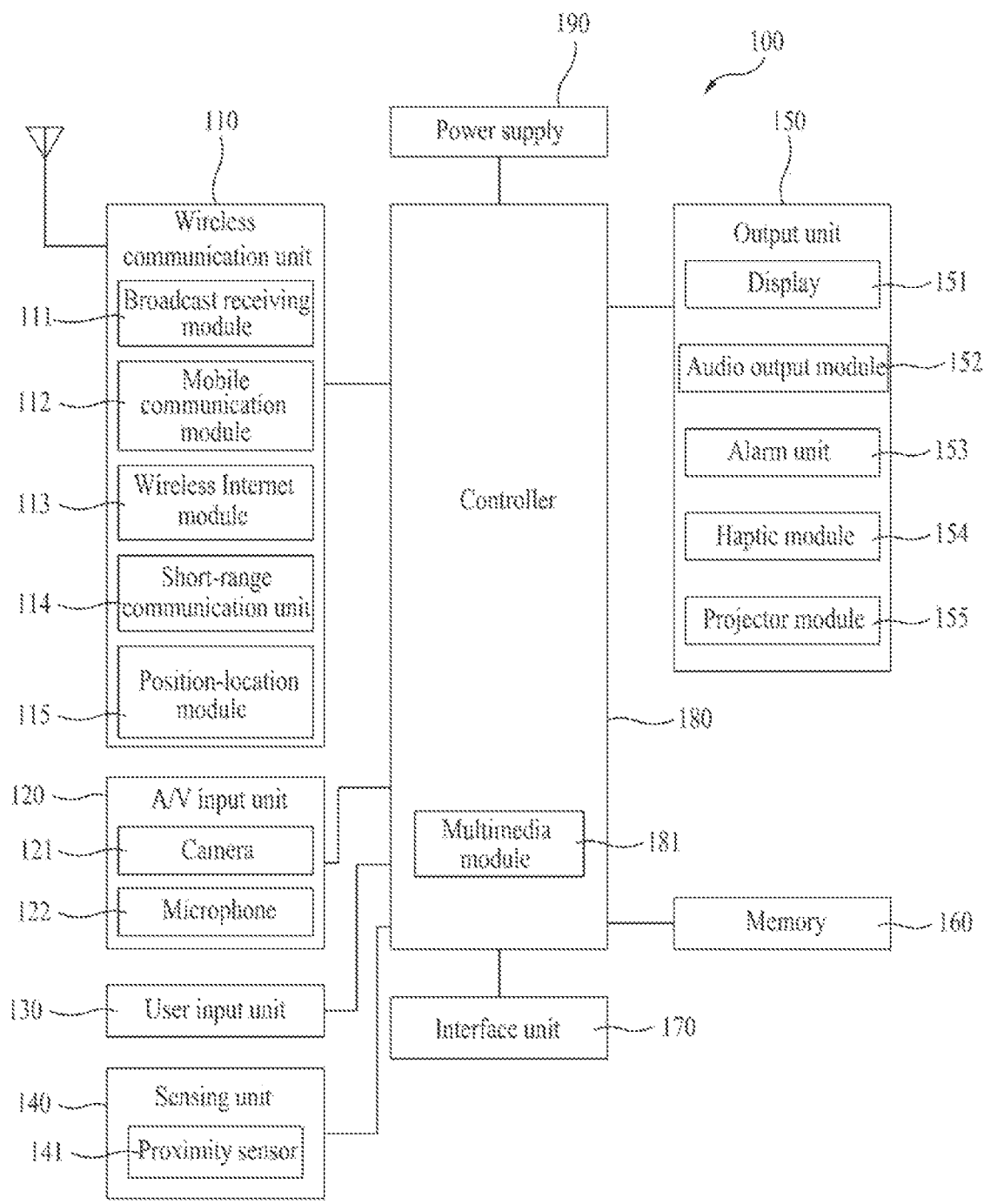
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor 141 using an electromagnetic field strength or infrared ray without mechanical contact. Hence, the proximity sensor has durability longer than that of a contact type sensor and also has utility wider than that of the contact type sensor.

The proximity sensor 141 can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor 141.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
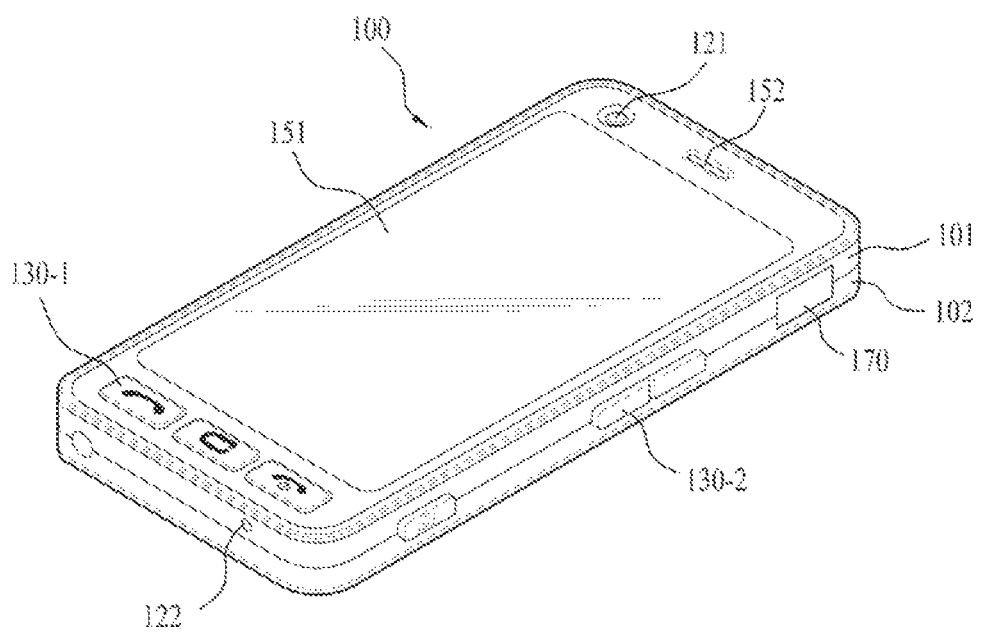
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/130-1 and 130-2, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 130-2 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 130-1 and 130-2. The manipulating units 130-1 and 130-2 can be named a manipulating portion and may adopt any mechanism of a tactile manner that enables a user to perform a manipulation action by experiencing a tactile feeling.

Content inputted by the first or second manipulating unit 130-1 or 130-2 can be diversely set. For instance, such a command as start, end, scroll and the like is inputted to the first manipulating unit. And, a command for a volume adjustment of sound outputted from the audio output unit 152, a command for a switching to a touch recognizing mode of the display 151 or the like can be inputted to the second manipulating unit 130-2.

Interconnected operational mechanism between the display 151 and the touchpad are explained with reference to FIG. 3 as follows.

Figure 3:
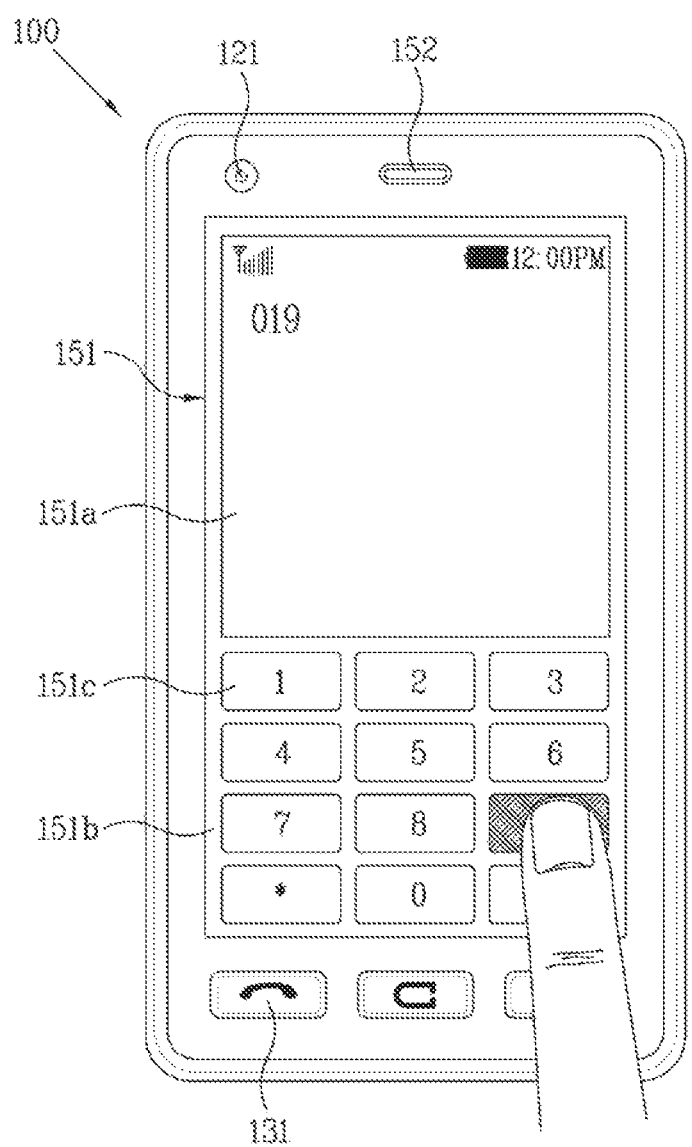
FIG. 3 is a front diagram of a mobile terminal according to one embodiment of the present invention for explaining one operational status of the mobile terminal.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 130-1 is manipulated, a call connection for the phone number displayed on the output window 151a is attempted.

Besides, the display 151 or the touchpad can be configured to receive a touch input by scroll. A user scrolls the display 151 or the touchpad to shift a cursor or pointer located at an entity (e.g., icon or the like) displayed on the display 151. Furthermore, in case that a finger is shifted on the display 151 or the touchpad, a path of the shifted finger can be visually displayed on the display 151. This may be useful in editing an image displayed on the display 151.

To cope with a case that both of the display (touch screen) 151 and the touchpad are touched together within a predetermined time range, one function of the terminal 100 can be executed. The above case of the simultaneous touch may correspond to a case that the terminal body is held by a user using a thumb and a first finger (clamping). The above function can include activation or deactivation for the display 151 or the touchpad.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

According to one embodiment of the present invention, provided are a mobile terminal and controlling method thereof, which enables a user to freely adjust an execution region of an application related to an event occurring in a multitasking environment.

In general, an application is conceptionally used as software separately installed and/or executed. Yet, an application mentioned in the description of the present invention conceptionally indicates all targets that visually display information on a prescribed region when a specific function is executed.

Figure 4:
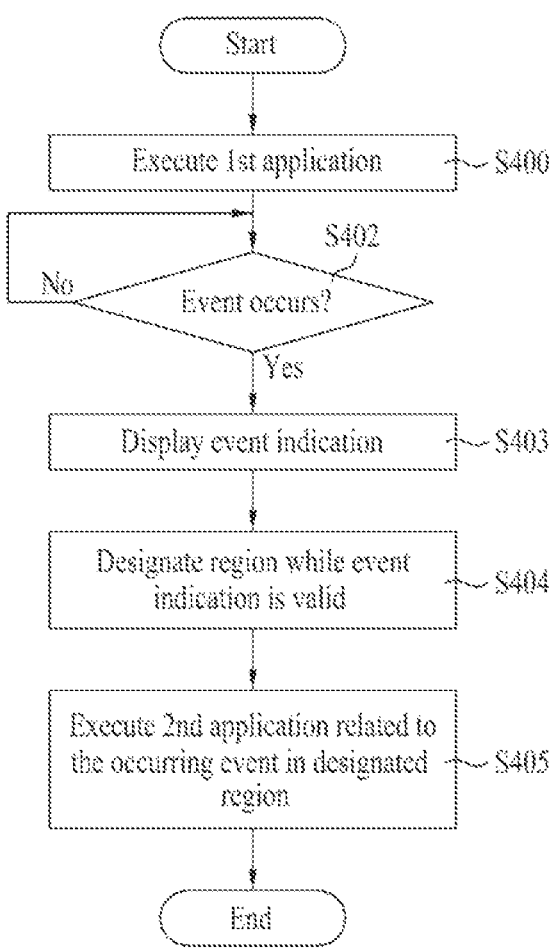
FIG. 4 is a flowchart of a process for setting a region for multitasking in a mobile terminal according to one embodiment of the present invention.

FIG. 4 is a flowchart of a process for setting a region for multitasking in a mobile terminal according to one embodiment of the present invention.

Referring to FIG. 4, a user is able to execute a random application (hereinafter named a first application) in a manner of performing a prescribed menu manipulation via the user input unit or selecting a shortcut icon for a specific application from a basic standby image (i.e., home screen or wallpaper) or due to such a reason as an incoming call, a message reception and the like [S401].

While the first application is executed, an event related to another application (hereinafter named a second application) can occur [S402].

For example of this event, there is a communication event (e.g., a voice call, a video call, a message arrival, a mail arrival, etc.) or an alarm event (e.g., a time announcement, an anniversary indication, a schedule indication, etc.).

If one of the above events occurs, an event indication indicating that the corresponding event has occurred can be displayed on the display 151 [S403]. In doing so, the event indication is displayed on a preset region and can be set to have a type differing according to the occurring event. And, the event indication can include at least one portion of a type and content of the occurring event, which can be represented using one of characters, diagrams, numerals, images, videos and combination thereof. And, details of the event indication shall be described later.

The event indication can keep being displayed during a preset time or a valid time (e.g., during an attempt to connect a corresponding call in case of a voice call) according to an event. While the event indication is valid, a user is able to designate a region for executing a second application related to an occurring event [S404]. A method of designating the region for executing the second application shall be described in detail later in this disclosure.

Once the region for executing the second application is designated, the second application is executed and displayed in the designated region [S405].

In the following description, a detailed type of the event indication in the process for executing the second application through the region designation described with reference to FIG. 4 is explained with reference to FIG. 5.

FIG. 5 is a diagram of screen configurations for displaying an event indication related to a second application according to one embodiment of the present invention.

Referring to FIG. 5(*a*), a user selects an Internet browser icon as a first application from a basic standby screen or a main menu screen of the mobile terminal 100 and is then able to execute the selected Internet browser icon.

If so, an Internet browser can be displayed on a whole screen [FIG. 5(*b*)].

Referring to FIG. 5(*c*), if there is an incoming call for a voice call, an originator information 520 of a preset type can be displayed as an event indication. In this case, a second application can include a voice call function.

If an occurring event is an arrival of a text message, referring to FIG. 5(*d*), an icon 530 of a letter type for indicating a message arrival can be outputted as an event indication. Optionally, a message content can be partially displayed to substitute for the icon or according to elapse of time. In this case, the second application can include a text message check/replay function.

In case that an occurring event is an alarm according to the advent of a preset time, referring to FIG. 5(*e*), an icon 540 indicating an alarm time can be displayed. In this case, the second application can include an alarm time setting function.

In case that an occurring event is an alarm for a schedule previously set by a user, referring to FIG. 5(*f*), information 550 on a predetermined content can be displayed. In this case, the second application can include a calendar or schedule management/scheduler function.

The display type, content and position of the above-described event indication are exemplary, by which the present invention is non-limited. And, various event indication types are applicable to the present invention. Moreover, an effect, display position, display size, duration, exposed information and the like of the event indication can be separately customized by a user.

In the following description, a method of designating a region for executing a second application is explained with reference to FIG. 6.

Figure 6:
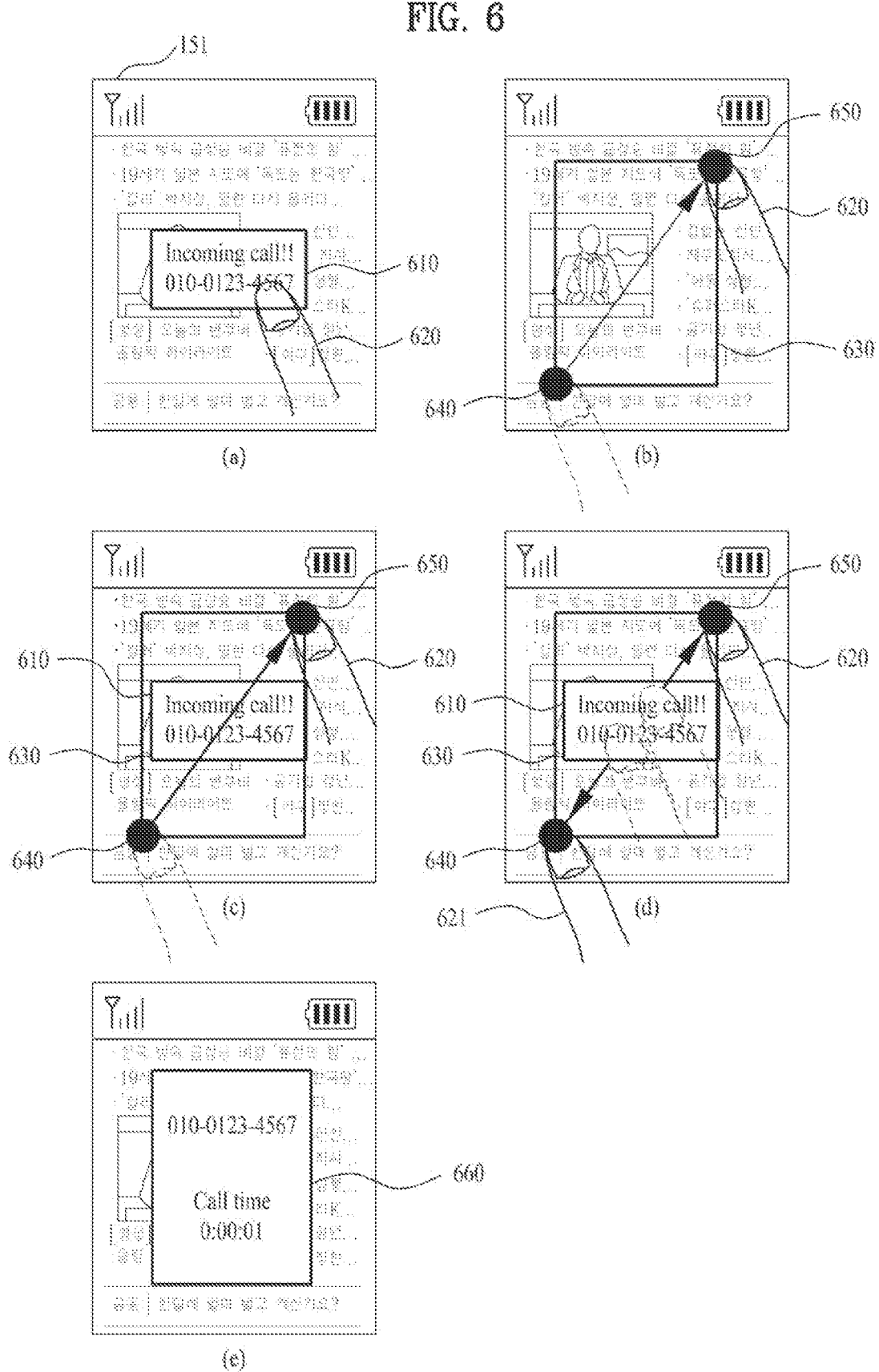
FIGS. 6(a)-6(e) are diagrams of screen configurations for displaying methods of setting a second application execution region based on touch according to one embodiment of the present invention.

FIG. 6 is a diagram of screen configurations for displaying methods of setting a second application execution region based on touch according to one embodiment of the present invention.

In FIG. 6, assume that the display 151 includes a touchscreen configured to recognize a user's touch input.

Referring to FIG. 6(*a*), while a web browser is executed as a first application, if there is an incoming voice call, an event indication 610 can be displayed on the display 151. In order to select a region for executing a voice call function by a method according to one embodiment of the present invention, it is able to touch (or select) the event indication 610 with a finger (or such a pointer as a touch pen and the like).

Accordingly, referring to FIG. 6(*b*), the event indication disappears from the display 115. And, it is able to designate a region 630 for executing a second application while an Internet browser is displayed. Therefore, a user is able to select a part of the first application blocked by the display of the second application from the first application which was being manipulated by a user until the occurrence of the event. In particular, in order to designate the region 630 for executing the second application, the user applies a touch input to a first point 640 and then applies a drag input for moving a touch point to a second point 650 by keeping the touched state. If so, a rectangle including the first and second points 640 and 650 as apexes opposing each other can becomes the region 630 for executing the second application. In doing so, a prescribed visual effect (e.g., an outline, an internal color, a pattern, a flickering effect, a transparency change, etc.) for indicating the rectangle can be given by real time to correspond to the touched point.

Alternatively, instead of the drag input, the first and second points 640 and 650 are sequentially touched. Alternatively, if the display 151 includes a touchscreen capable of supporting a multi-touch (i.e., a touch input for applying touches to at least two points simultaneously), both of the first points 640 and 650 can be simultaneously touched.

Unlike the case shown in FIG. 6(*a*), referring to FIG. 6(*c*), while the event indication 610 is valid, in case that a touch input is applied, it is able to set an initially touched point to be recognized as a first point 640. In this case, it is able to set the event indication 610 to disappear as soon as the first point is selected. Alternatively, it is able to set the event indication 610 to be maintained as it is. As a process after the selection of the first point is similar to the process shown in FIG. 6(*b*), a redundant description shall be omitted from the following description.

Referring to FIG. 6(*d*), in case that the mobile terminal 100 according to the present invention is provided with a touchscreen configured to recognize a multi-touch, while the event indication 610 is valid, a user is able to select a region for executing the second application by applying a touch input to two points simultaneously. After a touch input has been applied to one point on the touchscreen using two fingers 620 and 621 or two pointers, the two fingers are moved in directions getting far away from each other, respectively, until final touch release points are reached. Thus, the final touch release points can become the first point 640 and the second point 650, respectively.

If the region for displaying the second application is selected by one of the above methods (i.e., if the touch input is released), the second application can be executed and displayed on the selected region 660 shown in FIG. 6(*e*) for example.

Although the description with reference to FIG. 6 is made on the assumption that the display 151 includes the touchscreen, the present invention is also applicable to the case that the display 151 does not include the touchscreen. In particular, in order to select a first point and a second point, if a cursor is displayed to move to correspond to a hardware navigation key manipulation, an action of the cursor corresponding to a sequential touch or drag can perform the same function of the touch input individually or in a manner of combination with another selection key corresponding to a touched state.

According to another example of the present embodiment, a display type and information of a second application can be changed according to a type and/or position of a region designated by a user. This is explained with reference to FIG. 7 as follows.

FIG. 7 is a diagram of screen configurations for displaying an execution type of a second application in accordance with a type of a region designated by a user in a mobile terminal according to another example of one embodiment of the present invention.

In FIG. 7, assume a case that a voice call function is executed as a second application if a voice call event occurs in the course of executing an Internet browser as a first application. Moreover, assume that a region for executing a second application (hereinafter named a call function execution region) is selected by one of the above methods described with reference to FIG. 6 according to one embodiment of the present invention.

Referring to FIG. 7(a), in case that a call function execution region 710 is selected vertically long, each information item (e.g., number, originator name, call time, etc.) related to a call function can be arranged in a manner of shortening its horizontal length.

Referring to FIG. 7(b), in case that a call function execution region 710 is selected horizontally long, each information item can be arranged long in a horizontal direction.

In case that a call function execution region 710 is selected to have a size equal to or greater than a predetermined size (e.g., more than a half of a whole display unit size), more information can be additionally included than a case that the call function execution region 710 is selected to have a size smaller than the predetermined size. For example of the additionally included information, if a user's mobile terminal has a photo phonebook function of storing an originator's photo together with contact information, as shown in FIG. 7(c), an additional information 720 including an originator's photo and the like can be further displayed.

According to another embodiment of the present invention, when a list of applications currently executed in a multitasking environment is provided, a mobile terminal and controlling method thereof are provided to check and select the currently executed application.

Figure 8:
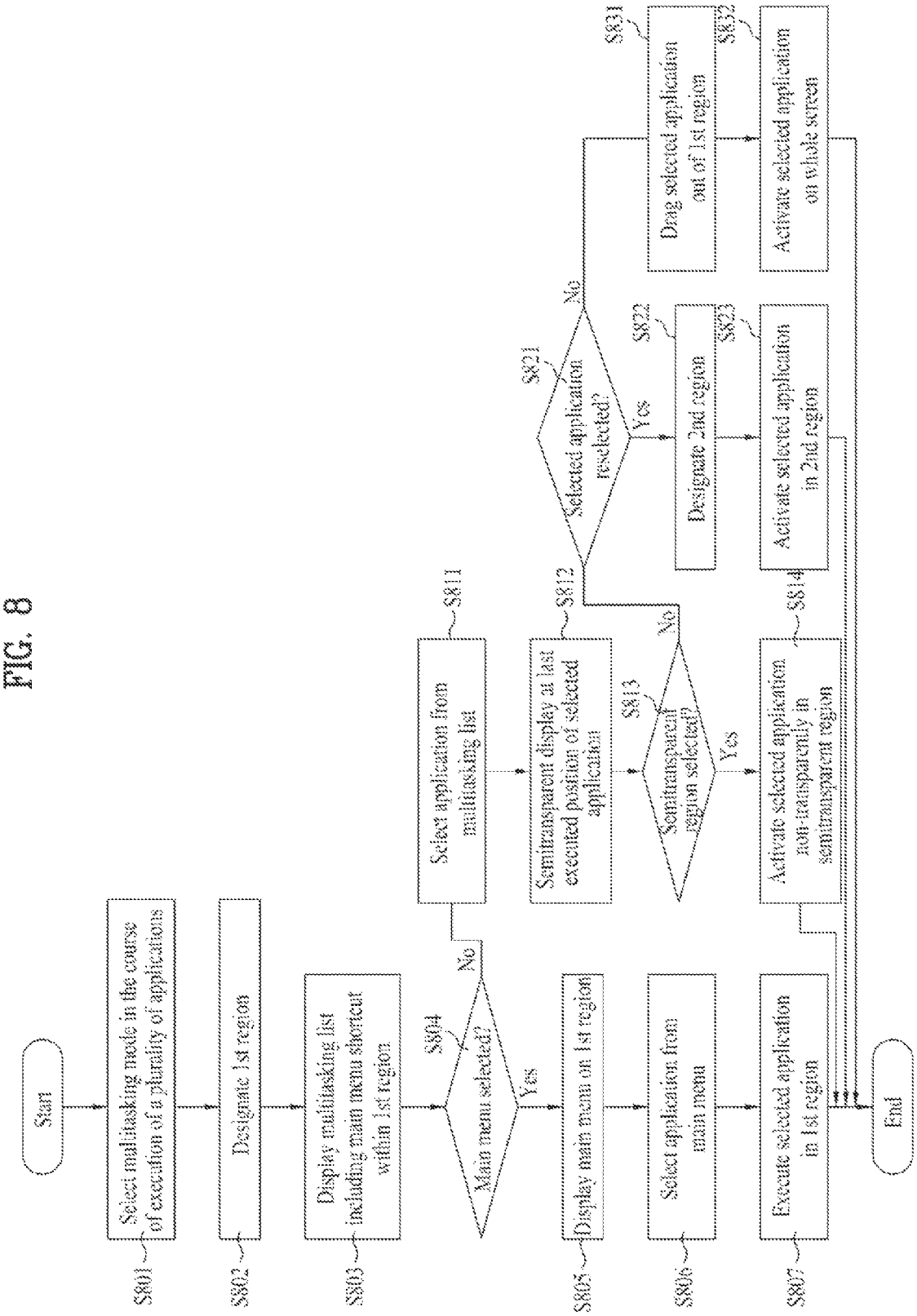
FIG. 8 is a flowchart of a process for checking and selecting a currently executed application if a list of applications currently executed in a mobile terminal according to another embodiment of the present invention is provided.

FIG. 8 is a flowchart of a process for checking and selecting a currently executed application if a list of applications currently executed in a mobile terminal according to another embodiment of the present invention is provided.

Referring to FIG. 8, as a multitasking is supported by the mobile terminal according to the present invention, at least two applications can be simultaneously executed [S801].

In this case, this application can be executed in a manner of performing a prescribed menu manipulation via the user input unit 130 or selecting a shortcut icon for a specific application from a basic standby image (i.e., wallpaper) or can be executed due to such a reason as an incoming call, a message reception and the like.

If a latterly executed application is executed on a whole screen or partially blocks an execution region of a formerly executed application, a user enables a list of currently executed applications (hereinafter named a multitasking list, for clarity) to be displayed to switch a work to the formerly executed application [S803].

It is able to page the multitasking list in a manner of selecting a hardware key button of an icon on a touchscreen, to which a function of displaying the multitasking list is given, or inputting a prescribed touch pattern (e.g., a drag input having a specific trace, a long touch, a touch consecutively inputted within prescribed duration, etc.) to a touchscreen. In case that a touchscreen supports a multi-touch capable of recognizing a touch input to at least two points identifiably, it is able to page the multitasking list via the multi-touch having a prescribed pattern. A type/position of a region for displaying the multitasking list is set in advance or can be determined via a touch input [S802]. This shall be described in detail with reference to FIG. 9 later.

The multitasking list displayed on the first region can include a shortcut function for a main menu in addition. In this case, the main menu shortcut can have a type of text, icon or combination thereof. The main menu shortcut is simultaneously displayed together with a currently executed application or can page a main menu via a prescribed manipulation. This shall be described in detail with reference to FIG. 10 and FIG. 11 later in this disclosure.

If the shortcut to the main menu is selected or a command for paging a prescribed main menu is inputted [S804], the main menu can be displayed on the first region [S805].

In this case, the main menu can be identical to a default main menu displayed on the basic standby screen or can only include a multitasking supported menu (application) among default main menus.

If the main menu is displayed on the first region, the user selects one application from the main menu [S806] and then executes the selected application on the first region [S807]. Alternatively, the user is able to newly designate a region for executing a selected new application or is able to execute the selected application on a whole screen.

Meanwhile, the user may not page the main menu from the multitasking list displayed on the first region. Instead, one of the applications, which are not currently displayed on the display 151 or partially blocked, (for clarity, hereinafter named "background applications" or "applications running in the background") can be selected [S811].

If one of the background applications is selected, the selected application is activated in the previous type that the corresponding application was last manipulated or can be displayed or activated on a whole screen. According to one embodiment of the present invention, in case that the display type of last manipulation before the selection of the selected background application is not the whole screen display, the selected background application can be displayed by having a prescribed visual effect given thereto [S812]. In this case, the prescribed visual effect can be given as the type that was last displayed at the last displayed position.

Foe example of the visual effect, there is a semitransparent effect, by which the present invention is non-limited. Alternatively, such a visual effect as a flickering effect, an outline emphasis and the like can be variously given. In the following description, a region, on which a background application having a prescribed visual effect given thereto, is named a semitransparent region, for clarity and convenience.

Afterwards, if the user selects the semitransparent region [S813], the selected background application can be activated while the semitransparent region becomes non-transparent [S814]. Moreover, if a drag touch is inputted in a manner of starting with a point on the touchscreen corresponding to the background application from the multitasking list to be released from the semitransparent region, the corresponding background application can be activated while the semitransparent region becomes non-transparent. This shall be explained in detail with reference to FIG. 12.

If the user does not select the semitransparent region but selects another background application from the multitasking list, the semitransparent region for the previously selected background application disappears and a new semitransparent region for the currently selected background application can be displayed.

Meanwhile, in case that the user reselects the previously selected background application from the multitasking list, a region for executing the selected background application can be newly designated by the user. If the user drags the background application previously selected from the multitasking list to a region except the semitransparent region and the region for displaying the multitasking list, the corresponding application can be executed on a whole screen. This shall be explained in detail with reference to FIG. 13 later in this disclosure.

In the following description, detailed configurations for implementing another embodiment of the present invention described with reference to FIG. 8 are explained with reference to FIGS. 9 to 13. In the following embodiments, assume that the display unit 151 of the mobile terminal includes a touchscreen configured to recognize a user's touch input.

Paging of Multitasking List

In the following description, a detailed configuration for paging a multitasking list is explained with reference to FIG. 9.

FIG. 9 is a diagram of screen configurations for displaying a method of paging a multitasking list according to another embodiment of the present invention.

In FIG. 9, assume that at least one background application is being executed. And, assume that a currently activated application is a web browser displayed on a whole screen, as shown in FIG. 9(a).

As mentioned in the foregoing description, a multitasking list can be paged via a touch input of prescribed pattern inputted to the touchscreen. For instance, referring to FIG. 9(b), a drag of a specific pattern (e.g., alphabet 'M' meaning the multitasking), i.e., a trace corresponding to an alphabet M is drawn using a pointer (i.e., a finger) 910 by maintaining a touch to an initial touch point and the touch is then released. In this case, the pattern of the alphabet M is exemplary only. The specific pattern can be replaced by another character or diagram. And, the specific pattern can be implemented in a manner of being arbitrarily set by a user through a prescribed menu manipulation. In case that a multitasking list is paged by a method shown in FIG. 9(b), a type, size and position of the multitasking list are preferably determined in advance. According to a touch pattern, it is able to display a multitasking list having a different type, size and position.

In case that the touchscreen recognizes a multi-touch, if a multi-touch of a prescribed pattern is inputted, a position and type of the multitasking list can be determined and displayed according to a pattern of the multi-touch without performing a separate menu manipulation. For instance, referring to FIG. 9(c), a user applies a drag input using his two fingers 910 and 911 in a manner that the two fingers 910 and 911 get farther from initial touch points 920 and 921, respectively. If so, a multitasking list can be paged to a rectangle 940 having a diagonal line formed by final touch points 930 and 931.

In case that a multi-touch is not used, referring to FIG. 9(d), a multitasking list can be paged to a rectangle 940 having apexes opposing each other (i.e., initial and final touch points 920 and 930 of a finger 910). Yet, in this case, before an initial touch is inputted, a multitasking list function is preferably selected via prescribed menu manipulation or key button input.

Type and Main Menu of Multitasking List

In the following description, a detailed type of a multitasking list and an executed type of a new application via a main menu are explained with reference to FIG. 10 and FIG. 11.

Figure 10:
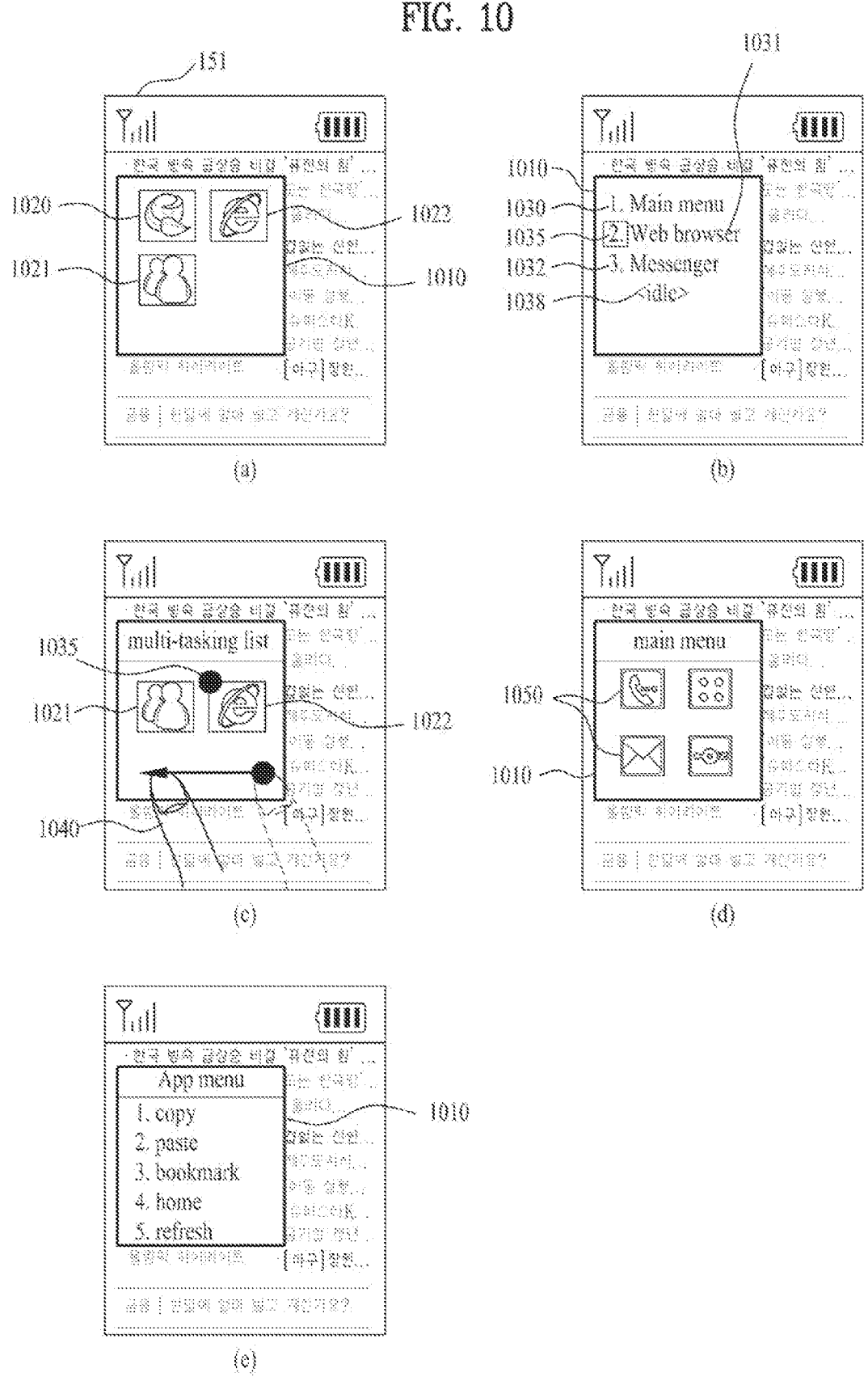
FIGS. 10(a)-10(e) are diagrams of screen configurations for displaying one example of a type and manipulating method of a multitasking list in a mobile terminal according to another embodiment of the present invention.

FIG. 10 is a diagram of screen configurations for displaying one example of a type and manipulating method of a multitasking list in a mobile terminal according to another embodiment of the present invention.

As mentioned in the foregoing description, a multitasking list according to the present invention is able to provide a shortcut function of directly going to a main menu. In FIG. 10, assume that a multitasking list is paged by one of the above methods described with reference to FIG. 9.

Referring to FIG. 10(a), a multitasking list 1010 can represent a list of a main menu shortcut function and currently executed applications. In particular, a main menu short cut icon 1020, an icon 1021 of at least one background application (e.g., an instant messenger) and an icon 1022 of an activated application (e.g., a web browser) can be displayed.

For another type of a multitasking list, referring to FIG. 10(b), a main menu 1030, a web browser 1031, a messenger 1032 and the like can be displayed as a text list. In this case, a prescribed visual effect can be given to the list to represent a current state. For instance, a diagram 1035 indicating a currently activated application, a text 1038 indicating an idle state of a background application and the like can be represented in addition. In this case, in order to access a main menu, a user is able to input a flicking touch in one direction (e.g., right to left) on a multitasking list to a touchscreen using a finger 1040.

Accordingly, the main menu including the main menu icons 1050, as shown in FIG. 10(d), can be displayed on a multitasking list region 1010.

In a situation shown in FIG. 10(c), a flicking touch is inputted to the multitasking list region in a direction opposite to the former direction (i.e., left to right), a currently activated application, as shown in FIG. 10(e), i.e., a control menu related to a web browser can be displayed.

Figure 11:
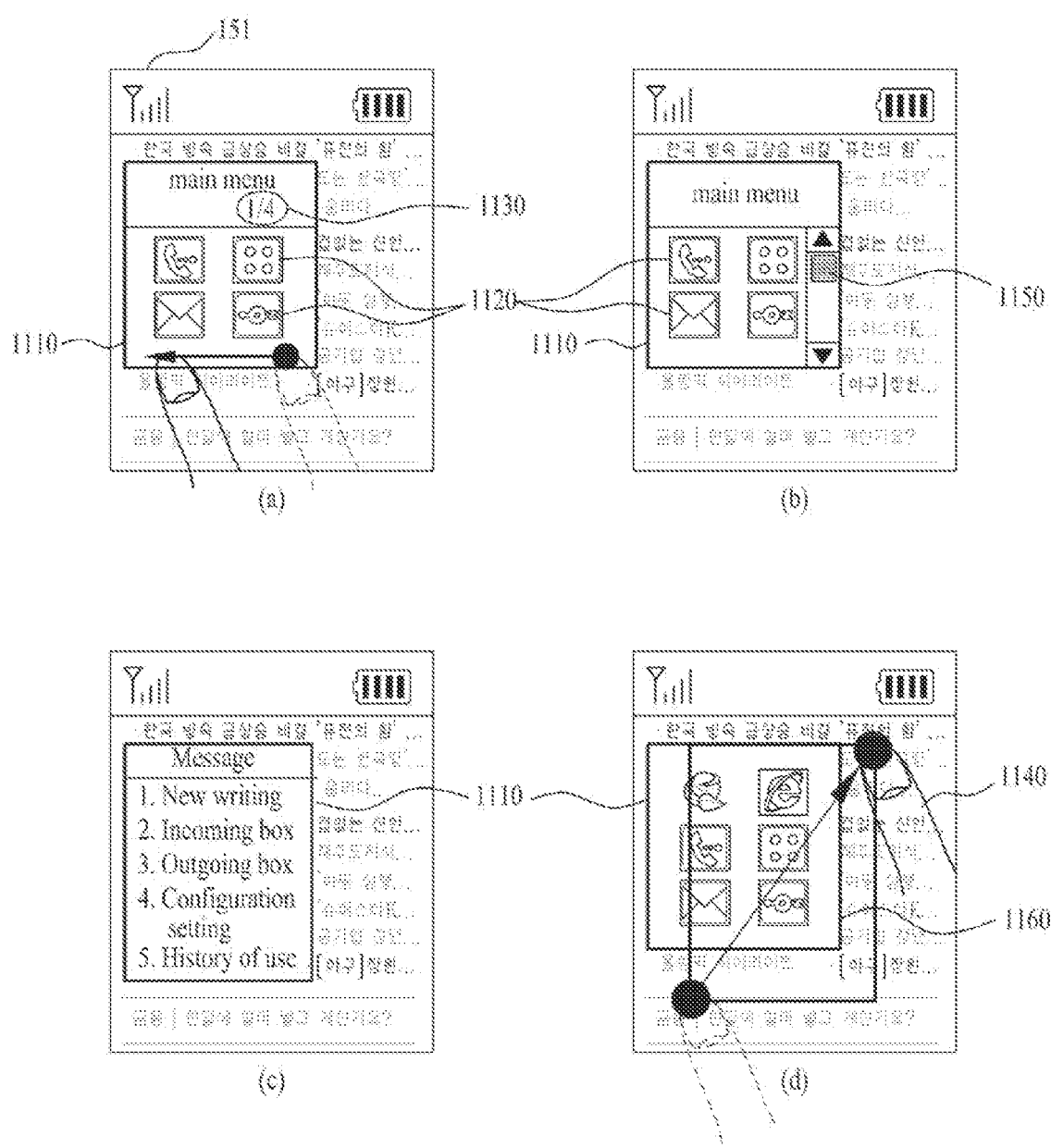
FIGS. 11(a)-11(d) diagrams of screen configurations for displaying one example of executing a new application via a main menu shortcut in a multitasking list of a mobile terminal according to another embodiment of the present invention.

FIG. 11 is a diagram of screen configurations for displaying one example of executing a new application via a main menu shortcut in a multitasking list of a mobile terminal according to another embodiment of the present invention.

In FIG. 11, as mentioned in the foregoing description with reference to FIG. 10, it is assumed that each main menu is paged by selecting a main menu shortcut icon from a multitasking list or via such a prescribed command input as a flicking and the like.

Referring to FIG. 11(a), main menu icons 1120 are displayed on a multitasking list region 1110. In this case, if the icons belonging to the main menus are not displayed on the multitasking list region 1110 due to the limitation put on a size of the multitasking list region 1110, a page partitioning method indicating how many pages further exist in addition to the main menu page displayed on a current region can be used as a [current page/all pages] format 1130.

Referring to FIG. 11(b), it is able to search/change a main menu icon displayed on a multitasking list region 1110 in a manner of displaying a scroll bar 1150 shown in FIG. 11(b) and then manipulating the displayed scroll bar 1150.

In this case, if a specific application (e.g., a message related application) is selected from the main menu, the corresponding application, as shown in FIG. 11(c), can be executed on the multitasking list region 1110. Alternatively, the selected application, as shown in FIG. 11(d), can be executed on a region 1160 determined by a touch pattern inputted by a user using a finger 1140 (or a pointer similar to the finger).

Activation of Background Application

In the following description, a method of selecting a background application from a multitasking list and then reactivating the selected background application is explained in detail with reference to FIG. 12 and FIG. 13.

Figure 12:
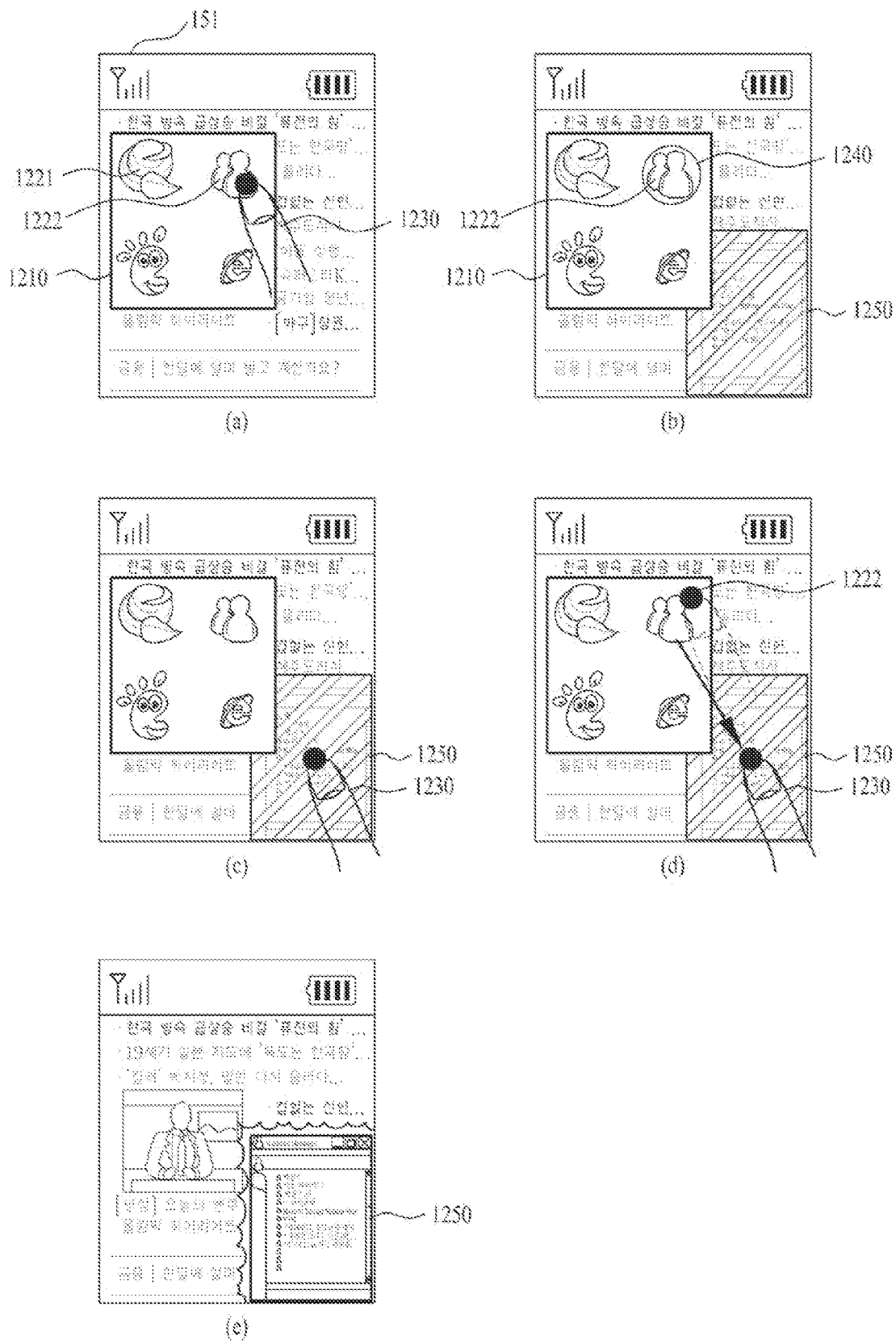
FIGS. 12(a)-12(e) diagrams of screen configurations for displaying one example of a method of activating a background application of the same type of a final execution type in a multitasking list according to another embodiment of the present invention.

FIG. 12 is a diagram of screen configurations for displaying one example of a method of activating a background application of the same type of a final execution type in a multitasking list according to another embodiment of the present invention.

In FIG. 12, it is assumed that a multitasking list is paged by one of the methods described with reference to FIG. 9. And, it is assumed that a currently activated application is a web browser currently executed on a whole screen. Moreover, it is assumed that an instant messenger and a picture file viewer are currently executed as background applications.

Referring to FIG. 12(a), a wallpaper shortcut icon 1221 and icons of currently executed applications are displayed on a multitasking list 1210. In this case, if a user attempts to activate an instant messenger, an instant messenger icon 1222 can be selected in a manner of applying a touch input to the instant messenger icon 12222 using a pointer 1230.

If so, referring to FIG. 12(b), a diagram 1240 can be displayed on the messenger icon 1222 to indicate that the corresponding icon has been selected. In particular, a prescribed visual effect can be given to a position 1250, as which the instant messenger was executed finally. In this case, the prescribed visual effect is assumed as a semitransparent effect. In doing so, if a user selects an icon of another background application, a diagram is displayed on the corresponding icon to indicate that the corresponding icon has been selected. The semitransparent effect is applied to the selected background application and the corresponding background application can be displayed at a final execution position.

After a semitransparent region has been displayed according to the user selection of the background application icon, if the user touches the semitransparent region 1250 with a pointer 1230 [FIG. 12(*c*)] or drags the messenger icon 1222 to the semitransparent region 1250 [FIG. 12(*d*)], the semitransparent effect disappears from the semitransparent region 1250 and then corresponding application can be activated [FIG. 12(*e*)].

Figure 13:
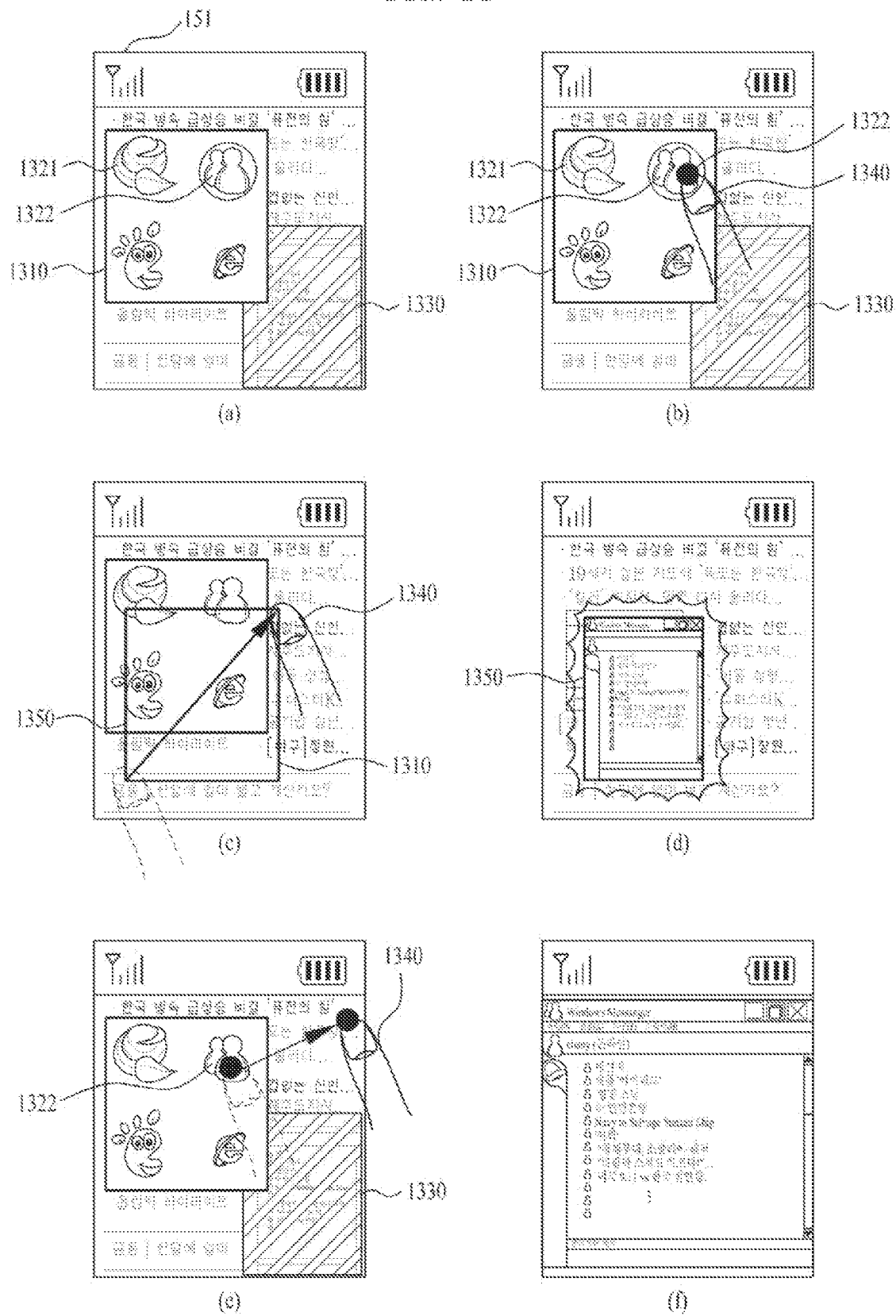
FIGS. 13(a)-13(f) are diagrams of screen configurations for displaying one example of displaying a method of designating a region for reactivating a background application or reactivating the background application on a whole screen in a multitasking list according to another embodiment of the present invention.

FIG. 13 is a diagram of screen configurations for displaying one example of displaying a method of designating a region for reactivating a background application or reactivating the background application on a whole screen in a multitasking list according to another embodiment of the present invention.

Regarding FIG. 13, the same assumptions for FIG. 12 are applied to FIG. 13.

Referring to FIG. 13(*a*), a wallpaper shortcut icon 1221 and icons of currently executed applications are displayed on a multitasking list 1310. In this case, a user selects an instant messenger icon 1322 so that a semitransparent region 1330 is displayed.

If the user reselects the instant messenger icon 1322, referring to FIG. 13(*b*), the controller 180 can recognize a next inputted touch input as a touch input for designating a region for reactivating the instant messenger.

Accordingly, the user is able to newly designate a region 1350 for reactivating the instant messenger by a touch input via a pointer 1340, as shown in FIG. 13(*c*). If the designation of the region 1350 is completed (i.e., the touch input is released), the instant messenger can be reactivated within the designated region, as shown in FIG. 13(*d*).

In order to activate a background application by switching the background application into a whole screen, if a user drags the instant messenger icon 1322 to an outer region except the semitransparent region 1340, as shown in FIG. 13(*e*), the instant messenger can be reactivated on the whole screen, as shown in FIG. 13(*f*).

Meanwhile, according to another example of the present embodiment, a method of reactivating a background application into a different type in consideration of the number of background applications is provided. This is explained with reference to FIG. 14.

FIG. 14 is a diagram of screen configurations for displaying one example of a type of reactivating a selected background application in accordance with the number of background applications according to another example of another embodiment of the present invention.

In FIG. 14, it is assumed that a multitasking list is paged by one of the methods described with reference to FIG. 9.

Referring to FIG. 14(*a*), a main menu shortcut icon 1421, an instant messenger icon 1422 of an instant messenger operating as a background and a web browser icon 1423 of a web browser as a currently activated application are included in a multitasking list 1410.

If the main menu shortcut and the currently activated application are excluded, a job-switchable background application includes the instant messenger only. In this case, if a user selects a background application via a pointer 1430, the selected application, as shown in FIG. 14(*b*), can be reactivated on a whole screen without displaying a semitransparent region and the like.

Referring to FIG. 14(*c*), a main menu shortcut icon 1421, an instant messenger icon 1422 of an instant messenger operating as a background, a picture file viewer icon 1424 and a web browser icon 1423 of a web browser as a currently activated application are included in a multitasking list 1410.

If the main menu shortcut and the currently activated application are excluded, job-switchable background applications include the instant messenger and the picture file viewer. In this case, both of the background applications can be simultaneously activated through a multi-touch. In particular, if a user selects the background applications 1422 and 1424 via two pointers 1430 and 1431, respectively, the selected two applications can be reactivated in a manner of partitioning a screen [FIG. 14(*d*)].

In the above-described embodiments, a touch action via a pointer can be replaced by a command input using a cursor manipulated via a navigation key or a key button corresponding to the navigation key. Moreover, functions assigned to a selection, reselection and outer drag input on a multitasking list can be changed in a manner different from that of the foregoing description.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
 a touchscreen; and
 a controller configured to control display of at least one executed application,
 wherein the touchscreen receives a first input for designating a first region on a screen of the touchscreen while the first application being executed in a foreground is displayed on the touchscreen, and the controller controls the touchscreen to display a menu list on the first region in response to the first input,
 wherein the menu list comprises a list of the at least one executed application, the list including a second application being executed in the background,
 wherein a prescribed visual effect is applied to a second region to indicate the background execution of the second application while a region to indicate the application displayed in the menu list selected without executing the second application in the foreground, wherein the second region corresponds to a last position on which the second application was displayed when the second application was executed in the foreground, wherein the touchscreen receives a second input for selecting the second application from the menu list, and the controller controls the touchscreen to display the second application being executed in a background on the first region or the second region on the touchscreen in response to the second input, the second region being different from the first region, and wherein the controller controls the touchscreen to display the second application on the second region in response to the second input.

2. The mobile terminal of claim 1, wherein the second application is invisible on the second region while the second application is executed in the background.

3. The mobile terminal of claim 1, wherein:
the touchscreen receives a touch input via the second region or receives a drag touch input which starts from a region corresponding to the second application displayed in the menu list and ends at the second region, and
the controller is further configured to remove the prescribed visual effect from the second region in response to the touch input to indicate that the second application displayed on the second region is executed in the foreground.

4. The mobile terminal of claim 1, wherein:
the touchscreen receives a touch input via a region corresponding to the second application in the menu list after receiving the second input, and further receives a third input designating a third region after receiving the touch input;
the first, second, and third regions are different from each other; and the controller controls the touchscreen to display the second application on the designated third region in response to the third input.

5. The mobile terminal of claim 4, wherein the controller controls the touchscreen to stop displaying the first and second regions upon receiving the third input, and is further configured to activate the second application in the third region.

6. The mobile terminal of claim 1, wherein:
the touchscreen receives a drag touch input after receiving the second input, the drag touch input starting from a region corresponding to the second application in the menu list and ending at a region on the touchscreen that is not the first and second regions; and
the controller is further configured to activate and display the selected second application on the entire touchscreen in response to the drag touch input.

7. The mobile terminal of claim 1, wherein the at least one executed application is displayed as an icon in the menu list.

8. The mobile terminal of claim 7, wherein the menu list further includes at least text corresponding to the at least one executed application or a diagram representing a status of each of the at least one executed application.

9. The mobile terminal of claim 8, wherein the status includes an activated state, a background state or an idle state.

10. The mobile terminal of claim 1, wherein the prescribed visual effect applied to the second region comprises either a flickering effect or a semi-transparent effect.

11. The mobile terminal of claim 1, wherein:
the first input comprises one selected from the group consisting of manipulation of a key button, a drag input having a preset trace and received via the touchscreen, a long touch input received via the touchscreen, a repeated touch input consecutively received via the touchscreen within a prescribed duration, and a multi-touch input simultaneously received at two points on the touchscreen; and
the second input comprises a touch input received via a region corresponding to the second application in the menu list.

12. The mobile terminal of claim 11, wherein the key button comprises at least a hardware key button or a virtual key button displayed on the touchscreen.

13. The mobile terminal of claim 11, wherein the two points of the multi-touch input define the first region such that the controller recognizes a rectangle having a diagonal line, of which two end points are two touch release points of the multi-touch input as the first region.

14. The mobile terminal of claim 12, wherein:
the menu list further includes a shortcut for a main menu; and
the controller controls the touchscreen to display the main menu on the first region in response to an input for selecting the shortcut, the menu list replaced by the main menu in the first region.

15. The mobile terminal of claim 14, wherein the controller is further configured to activate the second application in the first region when the second application is selected from the main menu.

16. The mobile terminal of claim 14, wherein the shortcut is selected via a flicking touch input received via the first region on the touchscreen in a specific direction or via selection of an icon corresponding to the shortcut for the main menu.

17. The mobile terminal of claim 1, further comprising a memory storing a specific pattern related to a touch input, wherein the touchscreen receives the touch input before receiving the first input for selecting the first region, the touch input received in the specific pattern, and the touchscreen is further configured to receive the first input in response to the touch input, the specific pattern comprising a trace corresponding to a character or a symbol representing the menu list.

* * * * *